Sept. 3, 1940.  W. A. KUEHL  2,213,367
SOLDERING IRON STANDS
Filed June 14, 1939
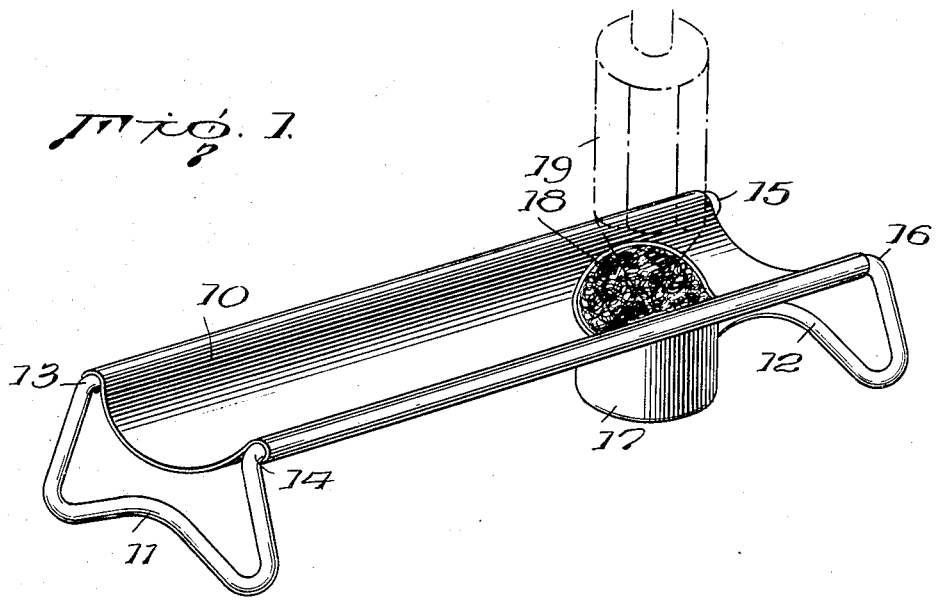
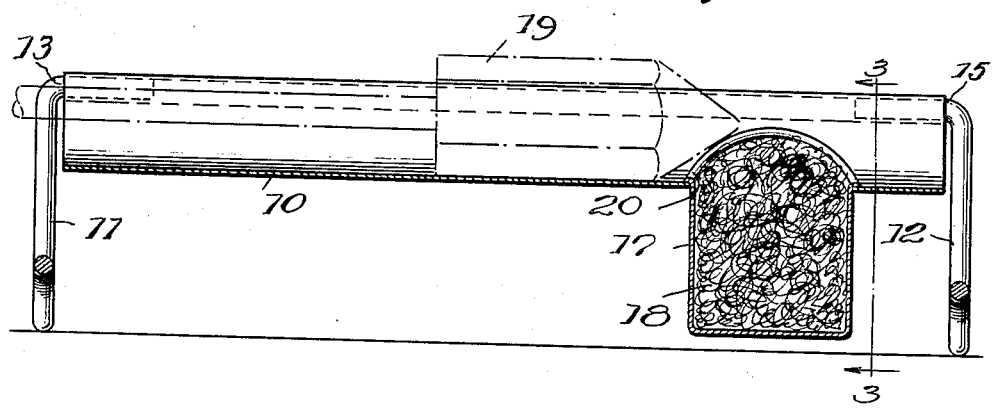
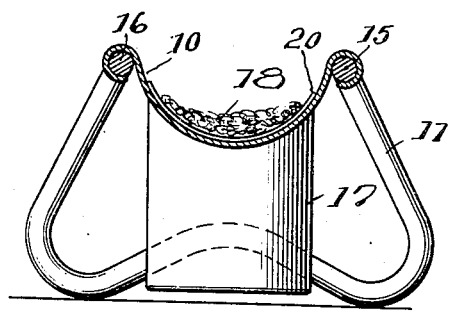
Inventor
W. A. Kuehl,
By Ben J. Chromy
his Attorney Patented Sept. 3, 1940

2,213,367

UNITED STATES PATENT OFFICE 2,213,367

SOLDERING IRON STANDS

Walter A. Kuehl, Chicago, Ill.

Application June 14, 1939, Serial No. 279,206

2 Claims. (Cl. 113—111)

This invention relates to soldering iron stands or holders in general. More particularly this invention relates to soldering iron stands or holders which are provided with means for cleaning the tip of the soldering iron.

An object of this invention is to provide a soldering iron stand upon which the soldering iron may be placed when not in use, said stand having attached thereto a cleaning or abrading element or elements which may be used for cleaning the tip of the soldering iron so that said tip will be in condition to be tinned prior to the soldering operation.

Another object of this invention is to provide a soldering iron stand or support of metallic or similar material, said stand or support having a bed upon which the soldering iron may be positioned and in which a depression or well for receiving cleaning or abrading material for cleaning the soldering iron tip, is formed.

Other and further objects of this invention will be apparent to those skilled in the art to which it relates from the following specification and claims.

In accordance with this invention I provide a soldering iron holder or stand upon which the working element of the soldering iron may be placed or laid either in the hot or cold condition when it is not in actual use. It is well known that when the tip of a soldering iron is repeatedly heated that it becomes coated with an oxide scale detrimental to the use of the iron for the purposes for which it was intended. This oxide scale must first be removed before the soldering iron tip may be properly tinned with solder and for this purpose I have provided a small well or depression formed in or attached to the bottom of the bed of the soldering iron stand and adapted to receive a small wad of abrading material such as steel wool. This abrading material is held in the aforesaid well snugly against rotation so that the tip of the soldering iron may be forced into the top of the steel wool wad and rotated therein under sufficient pressure to remove the oxide coating from said tip. It is of course obvious that materials other than steel wool, for example, copper wool impregnated with fluxes such as resin or salammoniac may be used. Where desired the steel wool also may be impregnated with a suitable flux such as the aforesaid fluxes.

Further details of this invention are set forth in the following specification and the drawing in which briefly Fig. 1 is a perspective view of a soldering iron stand made in accordance with this invention; Fig. 2 is a sectional view in vertical elevation of the stand and Fig. 3 is a cross section view taken along the line 3—3 of Fig. 2.

Referring to the drawing in detail reference numeral 10 designates the bed of the soldering iron stand, said bed being supported by the bent wire members 11 and 12 which are provided with end portions 13—14 and 15—16 respectively extending into the end openings of the rolled or tubular longitudinal edges of the bed 10. A cup-shaped member 17 is snugly fitted into a hole formed in the bottom of the bed 10. A flange 20 formed around the mouth of the cup 17 lies against the inner-surface of the bed adjacent to the hole and acts as a support for the cup. It is of course obvious that this cup may be fastened into the hole in various ways such as soldering, brazing, welding, riveting and the like. Furthermore the cup 17 may be given various shapes consistent with its function. A wad of steel wool 18 is pressed into the pocket, cup or well 17 and this wad is of sufficient size to be able to engage the inner-surfaces of the cup 17 so that when the tip of the soldering iron 19 is forced into this wad the soldering iron may be turned in the wad and the soldering tip properly cleaned. In Fig. 1 the soldering iron 19 is illustrated in broken lines for the purpose of showing the relative position of the soldering iron tip with respect to the steel wool wad as the soldering iron tip is being cleaned. When the soldering iron is not being used it may be placed upon the bed 10 as shown in Fig. 2 in broken lines and care should be taken not to leave the hot iron lying on the steel wool pad in contact therewith over extended periods of time since to do so would obviously accelerate the oxidation of the steel wool causing it to deteriorate rapidly.

Where desired the steel wool may be impregnated with a flux material, such as, rosin, salammoniac and the like. However if an excessive amount of such material is used it may cake up in the bottom of the cup 17 and make it difficult to remove the steel wool when replacement thereof is desired, without the application of heat to the bottom of the cup. It is of course obvious that the flux may be provided with a suitable solvent and used in this way so that the caking difficulty would be avoided.

It will be apparent that various modifications of this invention may be made without departing from the spirit and scope thereof and therefore I do not desire to limit this invention to the details of construction illustrated and described but claim it broadly as set forth in the claims.

What I claim is:

1. A soldering iron stand comprising a trough-like bed for receiving the heated section of the soldering iron, leg members attached to said trough-like bed for supporting it in a substantially horizontal position, a small cup-shaped member positioned in a hole formed in the bottom of said bed and depending from the bottom of said bed, said cup-shaped member being of a size slightly larger than the head of the soldering iron and having a flange formed around the mouth thereof for overlapping the edge of the said hole and retaining said cup in said depending position, said cup-shaped member being adapted to receive a cleaning element into which the tip of the soldering iron may be placed before use.

2. A soldering iron accessory for supporting and cleaning the soldering iron, comprising: a trough-like supporting member, legs attached to said trough-like supporting member for holding said member in a substantially horizontal position, a small cup-shaped member fastened in a hole formed in said trough-like supporting member and depending from the bottom of said supporting member, and a wad of metallic wool stuffed into said cup-shaped member to grip the walls of said cup-shaped member so that the tip of a soldering iron may be cleaned by working it in said metallic wool while said metallic wool is held in said cup-shaped member.

WALTER A. KUEHL.